United States Patent [19]

Gray

[11] Patent Number: 4,975,123
[45] Date of Patent: Dec. 4, 1990

[54] THERMOCOUPLES WITH BIMETALLIC JUNCTION ON CLOSED END AND COMPENSATING CONDUCTORS

[75] Inventor: Adrian L. Gray, Craighall Park, South Africa

[73] Assignee: Foseco International Limited, Birmingham, England

[21] Appl. No.: 511,963

[22] Filed: Jul. 17, 1990

Related U.S. Application Data

[63] Continuation of Ser. No. 304,284, Jan. 31, 1989, abandoned.

[30] Foreign Application Priority Data

Feb. 16, 1988 [ZA] South Africa .................. 88/1059

[51] Int. Cl.$^5$ ........................................... H01L 35/02
[52] U.S. Cl. ................................... 136/230; 136/233; 136/236.1
[58] Field of Search .................. 136/230, 233, 236.1

[56] References Cited

U.S. PATENT DOCUMENTS

| 3,816,183 | 6/1974 | Kraus ............................ 136/234 |
| 3,923,552 | 12/1975 | Parris ........................... 136/234 |
| 3,954,507 | 5/1976 | Carter .......................... 136/233 |
| 4,125,738 | 11/1978 | Nichols ........................ 136/234 |
| 4,243,402 | 1/1981 | Sensi ............................ 136/234 X |
| 4,337,221 | 6/1982 | Gray et al. ................... 136/234 X |
| 4,724,428 | 2/1988 | Brown, Jr. ................... 136/234 X |

FOREIGN PATENT DOCUMENTS

| 268277 | 10/1964 | Australia . |
| 905463 | 3/1987 | Belgium . |
| 1541784 | 10/1968 | France . |
| 2382683 | 9/1978 | France . |
| 801036 | 2/1980 | South Africa . |
| 807404 | 11/1980 | South Africa . |
| 814642 | 7/1981 | South Africa . |
| 1320820 | 9/1973 | United Kingdom . |
| 2204732A | 5/1988 | United Kingdom . |

Primary Examiner—Peter A. Nelson
Attorney, Agent, or Firm—Nixon & Vanderhye

[57] ABSTRACT

This invention concerns thermocouples for the measurement of temperature of molten metal which have a bimetal junction located in a closed outer end of a length of quartz glass tube with the wire ends separated around a plug in the open end of the tube and connected to the compensating conductors of the thermocouple.

10 Claims, 2 Drawing Sheets

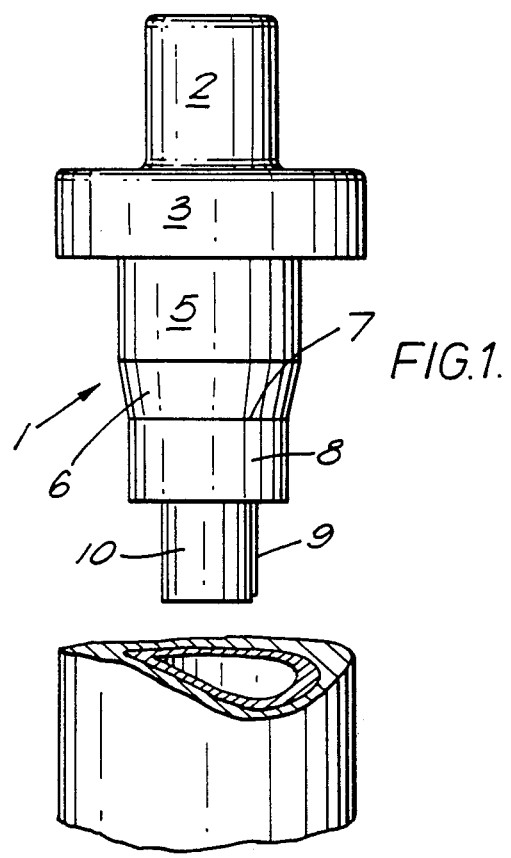
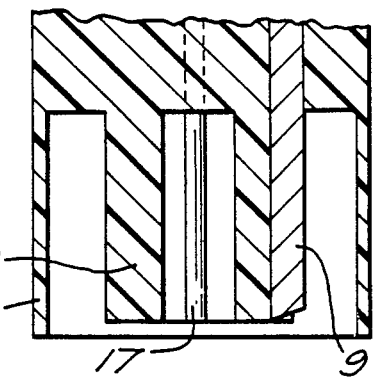
FIG.1.
FIG.4.

THERMOCOUPLES WITH BIMETALLIC JUNCTION ON CLOSED END AND COMPENSATING CONDUCTORS

This is a continuation of application Ser. No. 304,284, filed Jan. 31, 1989, now abandoned.

This invention relates to thermocouples for use in the measurement of temperatures of molten metals.

Thermocouples are widely used to measure temperatures of molten metals during steel and alloy manufacture and in foundries and the like. It is desirable that these instruments, which are generally used only once, measure consistently one with another and also measure accurately. Further, because they are disposable articles, it is preferable that this cost be kept as low as possible.

Many types of thermocouples are known and one type of which, there are several variations, uses a bi-metal junction between platinum and platinum/rhodium located at the apex of the U in an inverted quartz glass U-tube. This bimetal junction is known as the hot junction. The two free ends of the wires hereinafter referred to as "hot zone wire", project from the two open ends of the glass tube.

These ends are connected to selected specific base metal wire leads known as the compensating conductors which are connected into the measuring and recording equipment.

The thermocouple includes ceramic materials to protect the compensating conductors against excessive temperature during dipping of the thermocouple into molten metal. All this is well known to those knowledgeable in the manufacture and use of this type of thermocouple as are the difficulties in manufacture encountered when trying to achieve accurate and consistent results. Because of the antagonistic environment in which these thermocouples are used it is also important that these instruments have a short response time.

Also, generally speaking, in the interests of economy, the length and cross-section of noble metal hot zone wire must be reduced to the minimum amount possible. Cross-section has already been reduced to 50 microns, which is the minimum point, relative to current methods, at which sufficient strength exists to withstand the rigours of immersion. Length is reduced by attachment to the base metal compensating conductors which have the same electromotive properties at temperatures not exceeding approximately 200° C. Thus thermal equilibrium between the hot junction and the liquid metal must be reached, whilst a massive thermal gradient must be maintained between the liquid metal and the base metal compensating conductors. In other words, the transfer of thermal energy from the melt to the hot junction must not be inhibited, whereas transfer to the compensating conductors must indeed be inhibited. Transfer to the compensating conductors can be inhibited by encapsulation in a material which has a high specific heat capacity and sufficient mass to maintain the required thermal gradient for a given time. It follows that the hot junction must be placed in a location sufficiently remote from the lower end of this thermal gradient to permit the junction to reach thermal equilibrium with the melt within the same given length of time. This is the thermocouple response time referred to above. In addition, because the melt is electrically conductive, the hot junction and those portions of hot zone wire exposed to the melt must be electrically insulated. Since the generated electro-motive force in the thermocouple is extremely small and thermal equilibrium is signalled by a stable voltage, electrical noise will mask the attainment of thermal equilibrium between the hot junction and the melt. Similarly, any breakdown in thermal insulation of the compensating conductors will cause fluctuations in the voltage and thus have a similar masking effect.

The object of the present invention is to provide a thermocouple which will meet the above requirements to a reasonable practical degree.

According to this invention there is provided a thermocouple comprising a bimetal junction located in the closed outer end of a length of quartz glass tube with the separated free ends of the hot zone wires projecting from the open opposite end of the tube around a plug inserted into the tube and connected to the compensating conductors of the thermocouple.

Further features of this invention provide for the hot zone wires to be platinum and platinum/rhodium and for the wires connected to the compensating conductors by locating the wires in slots in the compensating conductors which are subsequently crimped or by welding the wires to the conductors and for the glass tube and wires to be held in position by a sleeve of suitable plastics material heat shrunk around the assembly of glass tube, plug and wire to conductor connections.

The invention also provides for the open end of the glass tube and the heat shrunk sleeve to be embedded in suitable refractory material formed to have an outer peripheral flange around one end around the glass tube and from which the closed end of the glass tube projects while the other end terminates against a peripheral shoulder formed on the plug.

This refractory casing may be made in known manner with an outer plastics material sleeve around the flange and part of its body portion so that it can be readily inserted in the end of a protective immersion tube around the end of a lance to which the thermocouple can be fitted.

These and other features of this invention will become apparent from a description of one embodiment of the invention which is given below with reference to the accompanying drawings.

In the drawings:

FIG. 1 is an elevation of a thermocouple assembly according to the invention;

FIG. 4 is a vertical cross-section of part of an assembly of the invention showing an alternative configuration.

Figure 2:
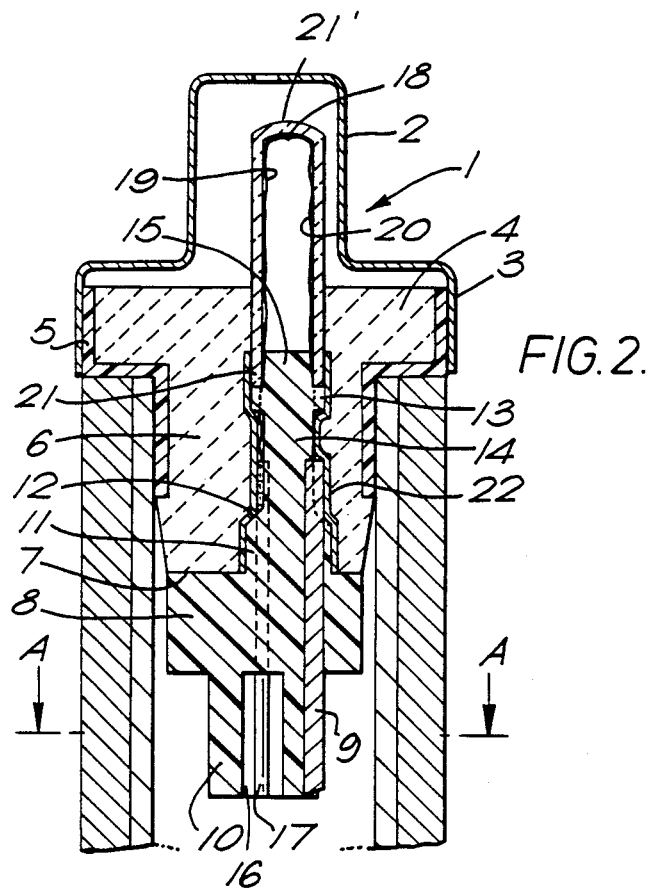
FIG. 2 is a vertical cross-section of the assembly shown in FIG. 1.
Figure 3:
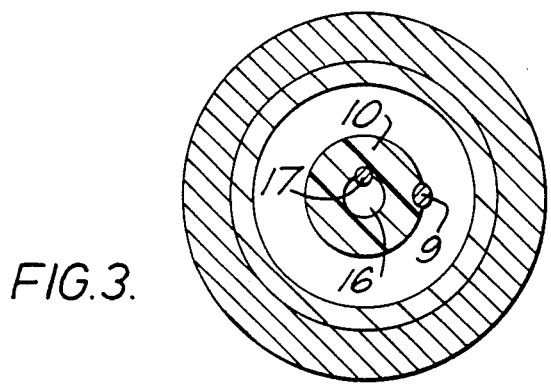
FIG. 3 is a transverse cross-section at a point indicated by line A—A in FIG. 2.

FIG. 1 shows the final shape of the thermocouple 1 having the usual metal cap 2 to protect the thermocouple during penetration of surface slag when the thermocouple is immersed in a bath of molten metal to determine the temperature of the latter. The cap 2 has an enlarged stepped portion 3 which fits over a peripheral flange 4 in a casing for the thermocouple and which is referred to below.

Within the cap 2 and projecting below it is a stepped sleeve 5 of plastics material which forms a mould for part of a casing 6 of suitable refractory material around the connection within the thermocouple of the bimetal hot junction wires to the compensating conductors. Part of this casing 6 is exposed and tapers down to a peripheral flange 7 on a plug 8 of suitable plastics material which carries one compensating lead 9 down the outside of the stem 10. The purpose of having the exposed part of the casing is to facilitate drying of the refractory material after it has been moulded.

The shape and size of the plug 8 including stem 10 is such that they form the contact block housing for the thermocouple and enable it to be attached and provide electrical connections for the lance for the temperature measuring instruments.

Also the stepped form of the sleeve 5 is such that it will enable the thermocouple to fit firmly in the end of a protective immersion tube enabling the thermocouple to be manipulated during temperature measuring operations.

Referring now to FIG. 2 it can be seen that the thermocouple consists of the plug 8 which has a pintle 11 projecting from the opposite side of the flange 7 to the stem 10. The pintle is stepped inwardly at 12 and a small shoulder 13 is provided around the narrowed portion 14 a short distance from its free end 15.

The material from which the plug is made is chosen to be rigid while nevertheless thermoplastic for reason explained more fully below.

The stem 10 has a blind hole 16 into the base thereof and the second compensating conductor 17 is located against the wall of this hole 16 and extends through the flange 7 and part of the pintle 11 to lie against the wall of the narrowed portion 14.

The compensating conductor 9 also extends through flange 7 and part of pintle 11 to lie against the wall of the narrowed portion 14 but diametrically opposite compensating lead 17.

Both the exposed ends of compensating conductors 9 and 17 are split radially with respect to the pintle 11. The reason for this is to enable the hot zone wires to be easily connected to the compensating conductors by crimping the conductors around the ends of the wires.

Alternatively, and possibly preferably the wires may be welded to the compensating conductors.

The hot junction 18 is formed from two wires 19 and 20 one being platinum and the other being platinum/rhodium as is usual practice with this type of thermocouple. These wires can have diameters of below 50 microns and can be used in the fully annealed state for the manufacture of the thermocouple to position these wires. Each wire 19 and 20 is carried by needle against the lower part of the pintle 11 where it is secured by the application of heat, to the material of the pintle. The end of each wire is then threaded into one of the slots in compensating conductors 9 or 17 and embedded by further heat into the shoulder 13. The wires are then carried above the shoulder at a predetermined distance where their ends are welded together to form the hot junction. This can conveniently be achieved by laser welding but other known techniques can be used.

Where the wires are welded to the conductors direct resistance welding is to be preferred and the compensating conductors can be used as one welding electrode. This makes the welding operation simple to achieve.

The result of the above is that a freestanding loop of the pair of wires extends from the shoulder 13.

A quartz glass tube 21, closed at one end 21' is fitted over the loop until the open end abuts the shoulder 13. The dimensions are chosen so that the hot junction and adjacent portions of the wires 19 and 20 are in contact with or very closely adjacent the closed end 21' of the tube.

It has been unexpectedly found that the wires 19 and 20 tend to remain against substantially diametrically opposed parts of the inner wall of the tube and are not easily dislodged from this position. This is accentuated if the length of the free-standing loop is made slightly longer than the distance from the inside of the closed end of the tube to the shoulder 13.

Preferably the wall thickness of the tube will be less than 1 mm. It has been found satisfactory to use a tube of 3 mm inside diameter with an outside diameter varying between 4.19 and 4.28 mm.

The elimination of a quartz glass U-tube from the design of the thermocouple provides numerous advantages all of which combine variously to enhance thermocouple cost effectiveness. Unlike the conventional device; no compressing, tensioning, handling or twisting of the hot zone wire occurs during assembly. As a consequence, fully recrystalised wire may be utilised and the need to stress relieve or anneal the hot zone wire is eliminated. No change in the microstructure of the wire occurs during welding and/or immersion thus avoiding the normal dramatic reduction in tensile strength and the consequent in situ thermocouple failure.

In addition, eliminating the need to thread hot zone wire into the glass tube also eliminates the inaccuracy which arises from a mis-placed hot junction. Furthermore, highspeed fully automated assembly is possible.

To hold the glass tube, exposed parts of the wires and compensating conductors in position a simple but very effective technique is used. A sleeve 22 of suitable plastics material is fitted over the glass tube and located around the pintle 11 and exposed parts of the wires and compensating leads and also around the open end 21 of the tube. This sleeve 22 is then heat shrunk and the glass tube is thus secured in position.

This assembly is then located in the casing 6 of refractory material by suitably positioning and retaining the stepped sleeve 5 and the assembly above described to enable the casing to be moulded in the sleeve 5 around the assembly to terminate against the flange 7.

Once the refractory has dried the thermocouple is ready for fitting into the end of the protecting tube for the lance of the measuring equipment.

FIG. 4 shows a modification to the plug 8. Here a thin walled skirt 23 of the material from which the plug 8 is manufactured extends from the periphery of plug 8 around the stem 10. This skirt 23 will, when the thermocouple is inserted into the protective tube, engage around the contactor block of the lance for the temperature measuring equipment.

The assembly is used in the well known manner to achieve the required results.

It is believed that the difference in the co-efficient of thermal expansion between the quartz glass and the hot zone wire ensures that these wires remain firmly in place even during the rigours of immersion into molten metal, and as a consequence there is no need for any form of electrical insulation in this hot zone. As a result, response time is greatly enhanced and the vibrating of the hot zone wire during immersion is eliminated.

Further all the conductors are thus fully insulated electrically and are exposed during immersion to non-metallic vapours only, no significant contamination can occur. Unlike the conventional device, neither free nor combined moisture from the refractory poses any potential threat to the efficacy of the device. Any minimal quantity of moisture vapour which may be present in the tube when it is sealed by the sleeve onto the plug has proven, as far as it has been possible to ascertain, of no consequence to the proper functioning of the thermocouple. In any event assembly can be done under appropriately dry conditions if necessary.

From FIG. 2 it will be noted that the axis of pintle 11 is offset from the axis of the stem 10. This enables the thermocouple also to be used with known equipment for measuring oxygen activity in molten metal in a way that is well known to those skilled in the art and which does not form part of the invention. This provision in the thermocouple is however a feature of the present invention.

What is claimed is:

1. A thermocouple comprising a bimetal junction located in a length of quartz glass tube, said bimetal junction joining two separate junction wires, said junction wires being connected to compensating conductors of the thermocouple, said quartz glass tube having two ends, the first end being a closed end wherein said bimetal junction is located and the second end being an open end through which both junction wires project around a plug inserted into said open end of said tube.

2. A thermocouple according to claim 1 in which the bimetal wires are platinum and platinum/rhodium wires.

3. A thermocouple according to claim 1 in which ends of the wires are inserted in slots in the compensating conductors and retained therein by crimping of the conductors.

4. A thermocouple according to claim 1 in which ends of the wires are welded to the compensating conductors.

5. A thermocouple according to claim 1 in which the assembly of glass tube, plug and wire to conductor connections are held in position by a sleeve of plastics material heat shrunk around the assembly.

6. A thermocouple according to claim 1 in which the open end of the glass tube and the heat shrunk sleeve are embedded in suitable refractory material formed to have an outer peripheral flange around one end around the glass tube and from which the closed end of the glass tube projects while the other end terminates against a peripheral shoulder formed on the plug.

7. A thermocouple according to claim 6 in which the refractory material has an outer plastics material sleeve around the flange and part of the remainder thereof 8. A thermocouple according to claim 1 in which the plug has a stem projecting from the end opposite that engaged in the glass tube surrounded by and spaced apart from a thin walled peripheral skirt.

9. A thermocouple according to claim 1 in which the bimetal junction is located against the closed end of the glass tube.

10. A thermocouple according to claim 1 including a perforated metal cap over the glass tube and engaging the flange formed of refractory material.

* * * * *